United States Patent
Helmersson et al.

(10) Patent No.: US 9,490,036 B2
(45) Date of Patent: Nov. 8, 2016

(54) CONTROL ROD

(75) Inventors: Sture Helmersson, Kolback (SE); Lars Hallstadius, Vasteras (SE)

(73) Assignee: Westinghouse Electric Sweden AB, Vasteras (SE)

( * ) Notice: Subject to any disclaimer, the term of this patent is extended or adjusted under 35 U.S.C. 154(b) by 454 days.

(21) Appl. No.: 13/642,136

(22) PCT Filed: Apr. 5, 2011

(86) PCT No.: PCT/EP2011/055240
§ 371 (c)(1),
(2), (4) Date: Oct. 19, 2012

(87) PCT Pub. No.: WO2011/131478
PCT Pub. Date: Oct. 27, 2011

(65) Prior Publication Data
US 2013/0039454 A1   Feb. 14, 2013

(30) Foreign Application Priority Data
Apr. 19, 2010   (SE) ...................................... 1050378

(51) Int. Cl.
*G21C 7/113* (2006.01)
(52) U.S. Cl.
CPC ............... *G21C 7/113* (2013.01); *Y02E 30/31* (2013.01); *Y02E 30/39* (2013.01)
(58) Field of Classification Search
CPC ........ G21C 3/3408; G21C 5/14; G21C 5/00; G21C 5/06
See application file for complete search history.

(56) References Cited

U.S. PATENT DOCUMENTS

| | | | |
|---|---|---|---|
| 4,929,412 A * | 5/1990 | Dixon et al. | 376/260 |
| 5,213,756 A * | 5/1993 | Fennern | 376/219 |
| 2002/0118788 A1 | 8/2002 | Nakayama et al. | |

FOREIGN PATENT DOCUMENTS

| | | |
|---|---|---|
| EP | 0511873 | 11/1992 |
| EP | 0986069 | 3/2000 |
| EP | 1933328 A2 | 6/2008 |
| JP | 01284796 | 11/1989 |
| JP | 2005147988 | 6/2005 |
| JP | 2008261673 | 10/2008 |
| SE | 531037 C2 | 11/2008 |

OTHER PUBLICATIONS

International Search Report for PCT/EP2011/055240 date Aug. 11, 2011.

* cited by examiner

*Primary Examiner* — Sean P Burke
(74) *Attorney, Agent, or Firm* — MKG, LLC

(57) ABSTRACT

A control rod for a nuclear boiling water reactor is described. The control rod has a longitudinal centre axis and control rod blades, each control rod blade having a first and a second side and being substantially parallel to the longitudinal center axis. Each control rod blade comprises an absorber material which extends from a first absorber end to a second absorber end, the distance between the first absorber end and the second absorber end defining an active length. The control rod blades are provided with distance means on the first and second sides of the control rod blades, the distance means extending a distance of at least a third of the active length of the control rod blade.

9 Claims, 4 Drawing Sheets

CONTROL ROD

FIELD OF THE INVENTION

The present invention relates to a control rod for a nuclear boiling water reactor wherein the reactor comprises a plurality of fuel assemblies, elongated channel boxes forming outer casings of each fuel assembly and enclosing fuel rods, and a plurality of control rods which are configured to be insertable in respective control rod positions between the fuel assemblies.

BACKGROUND

Fuel assemblies and control rods are positioned in the core of the nuclear boiling water reactor, BWR. The channel boxes of the fuel assemblies in the BWR usually consist of a corrosion resistant material with a low neutron absorption capacity, such as a zirconium based alloy.

The environment in the core of a BWR is demanding for the components positioned therein. The environment is for example highly oxidative. One of the consequences of this demanding environment inside the core of a BWR is that the channel box of the fuel assemblies may be distorted. The channel box may for example bulge or bow. Channel box bow is due to elongation of one channel box side relative the opposite channel box side. Channel box bow is known to arise for different reasons, e.g. initial manufacturing, residual stress relaxation under irradiation, differential irradiation growth and hydration as a consequence of shadow corrosion.

The problem of shadow corrosion on components comprising zirconium based alloys in the core of a BWR has been known for a long time. Shadow corrosion is a local corrosion enhancement and can appear on a zirconium based alloy component when the component is in close contact with another metal. Referring to the above, shadow corrosion on the outer side of a channel box can occur when a control rod blade is inserted next to the channel box, i.e. when the channel box consisting of a zirconium based alloy is in close contact with a control rod blade usually having an outer surface of stainless steel.

The degree of shadow corrosion depends on the distance between the two components. Direct contact gives most shadow corrosion and at a distance of about 5 mm it effectively disappears. Most of the effect has disappeared already at a distance of 2 mm.

Shadow corrosion early in the life of a fuel assembly, i.e. shadow corrosion on the fuel assembly due to an inserted control rod next to the fuel assembly during the first several months of operation, is generally believed to drive the problem of enhanced channel bow of the channel boxes in a BWR. The shadow corrosion can result in increased absorbed hydrogen-induced growth of the outer side of the channel box being closest to the control rod. The increased absorbed hydrogen-induced growth can lead to bowing of the channel box towards the control rod late in the life of the fuel assembly. The bow of the channel box towards the control rod may for example slow down or stop the control rod insertion in an emergency situation, or may lead to channel box-control rod interference, which may for example cause the fuel assemblies to lift due to friction when the control rods are inserted into the core.

The control rods are tested periodically with regard to proper functioning and interference. In case some interference is noted or suspected the testing intervals are shortened. With severe interference the control rod is parked in the safe position, i.e. fully inserted and disarmed. In either case the intended operation is disturbed as an ultimate result of the shadow corrosion.

Studies have shown that shadow corrosion strongly depends on the distance between the zirconium based alloy component and the component comprising another metal. The occurrence of shadow corrosion is therefore most significant in the case of a large control rod blade and a small distance between the control rod blade and the channel box.

The European patent application EP 0 986 069 describes a device and method for preventing shadow corrosion. The device comprises means arranged to electrically insulate at least a part of a second component from a first component in order to avoid shadow-corrosion on the first component.

SUMMARY

An object of the present invention is to mitigate shadow corrosion on the channel box of a fuel assembly of a nuclear BWR, thereby reducing the risk of shadow corrosion enhanced channel box bow.

Another object of the present invention is to provide a control rod with which the shadow corrosion on the channel box is mitigated.

At least one of these objects are achieved with a control rod according to the appended claims.

Further advantages of the invention are achieved with the features of the dependent claims.

According to a first aspect of the invention a control rod for a nuclear boiling water reactor is provided. The reactor comprises a plurality of fuel assemblies, elongated channel boxes forming outer casings of each fuel assembly and enclosing fuel rods, and a plurality of control rods which are configured to be insertable in respective control rod positions between the fuel assemblies. The control rod has a longitudinal centre axis and control rod blades, each control rod blade having a first and a second side and being substantially parallel to the longitudinal centre axis. Each control rod blade comprises an absorber material which extends along the longitudinal centre axis from a first absorber end to a second absorber end, the distance between the first absorber end and the second absorber end defining an active length of the control rod blade. The control rod is characterized in that the control rod blades are provided with distance means on the first and second sides of the control rod blades, the distance means extending a distance of at least a third of the active length of the control rod blade. The distance means are configured to ensure a minimum distance between the control rod blade and the channel box, and to enable the control rod to easily slide along the channel box.

The minimum distance ensured by the distance means mitigates the shadow corrosion on the channel box. As the distance means protrude from the control rod blades the distance means may be close to the channel boxes. Thus, the shadow corrosion may be enhanced in the areas of the channel box being closest to the distance means. These areas are only a small portion of the channel box. It is, however, still favourable to minimize the extension of the distance means. Thus, it is an optimisation problem to design the extension of the distance means. A large extension of the distance means along the longitudinal centre axis ensures a minimum distance between the control rod and the channel box. At the same time it is desirable to minimize the extension of the distance means in order to minimize the area of the distance means being close to the channel box and thereby minimizing the shadow corrosion.

The distance means may protrude 0.5-2 mm, preferably 0.5-1.5 mm, or more preferably 0.8-1.2 mm, from the sides of the control rod blades. The protrusion of the distance means may be optimized so that a minimum distance is ensured simultaneously with the shadow corrosion.

The distance means is distributed on the sides of the control rod blades. Such a distribution of the distance means may be accomplished in many different ways.

One way of accomplishing a distributed distance means is to provide the distance means as one or more protrusions. Advantaguously, the protrusions may have a smooth shape, seen in the direction of the centre axis, the smooth shape facilitating the sliding of the control rod along the channel box. In such a way the risk of the control rods getting stuck in the reactor is minized.

According to a further embodiment of the invention, at least one protrusion is provided on the upper portion of the control rod blade and at least one protrusion is provided on the lower portion of the control rod blade. This ensures a minimum distance between the control rod blade and the channel box in the lower portion as well as the upper portion.

According to a further embodiment of the invention, each protrusion comprises an elongated ridge. Preferably, 1-3 ridges may be provided on each side of the control rod blade. With such ridges the control rod may be arranged to be easily inserted in the reactor as each one of the ridges only have one edge that may get stuck on protruding objects in the reactor.

To further minimize the risk of the ridges getting stuck during insertion of the control rod in the reactor the ridges may be provided along lines extending in parallel to the longitudinal centre axis and distributed along the width of the first and second sides, radially out from the longitudinal centre axis.

Shadow corrosion is strongest during high power operation of the reactor. This corresponds to the situation in which only a small portion of the control rods are inserted into the reactor. Thus, it is most important to have the distance means on the part of control rod blades that are first introduced into the reactor. The control rod may be arranged to be inserted in the control rod position with the first absorber end first and the ridges may extend from the first absorber end on the first and the second sides of the control rod blades. This ensures a minimum distance between the control rod blades and the channel box when the reactor is operated at a high power.

The ridges may extend along the full active length on the first and the second sides of the control rod blades in order to ensure a minimum distance between the control rod blade and the channel box over the entire active length of the control rod blade. Alternatively, the ridges or one or more of the ridges may extend along a part of the full active length.

As an alternative to ridges each protrusion may comprise a spot-like protrusion. With spot-like protrusions the area of the distance means being close to the channel box may be minimized.

The control rod may comprise four control rod blades, the control rod blades being arranged to form a control rod having a cruciform cross section. This is the standard form of a control rod in a BWR reactor.

The distance means may be a homogeneous part of the control rod blades. This may be achieved for example by press forming of the control rod blade. Alternatively the distance means may be welded onto the control rod blades.

The control rod may be made mainly of a first material which is different from the absorber material. This is the normal way of designing a control rod as most suitable absorber materials have mechanical properties making them unsuitable for the load bearing parts of the control rod.

The design of the control rod according to the invention thereby prevents the control rod blades from coming too close to the channel box of the fuel assembly. Moreover, the design of the protrusions ensures a smooth insertion of the control rod between the fuel assemblies, preventing the control rod from being damaged.

DETAILED DESCRIPTION

Figure 1:
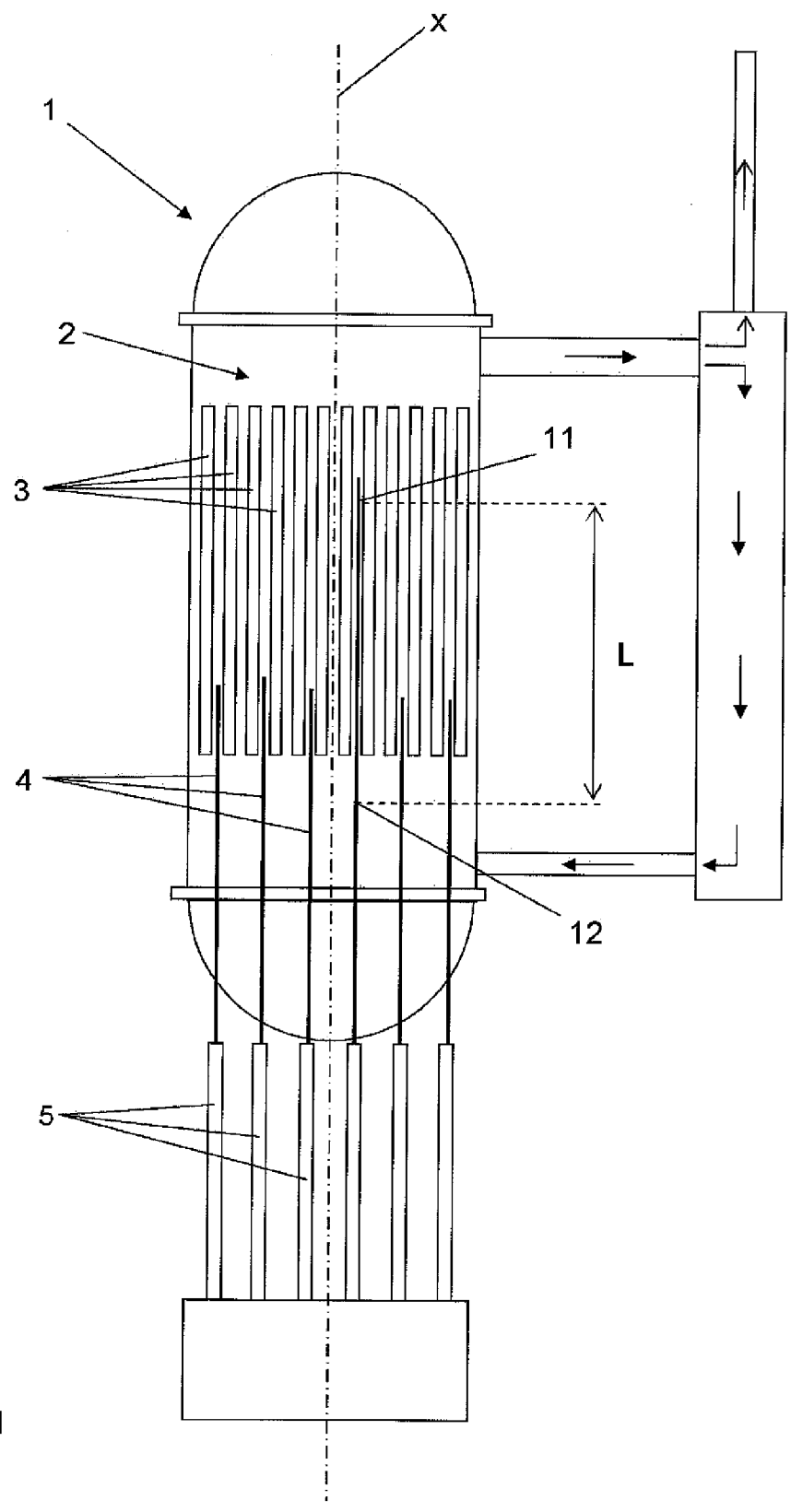
FIG. 1 schematically shows a nuclear plant comprising a reactor.

In the following description of preferred embodiments of the invention similar features in different figures will be denoted by the same reference numeral.

An embodiment of a nuclear boiling water reactor, BWR, which may comprise the control rod according to the invention will first be described with reference to FIG. 1. FIG. 1 shows part of a nuclear plant. The nuclear plant comprises a reactor 1. The reactor 1 comprises a core 2 having a plurality of fuel assemblies 3. Each fuel assembly 3 includes a plurality of elongated fuel rods 7 enclosed in a channel box 6, see FIG. 3. Each fuel rod 7 comprises nuclear fuel 7a and a cladding 7b enclosing the nuclear fuel 7a. The fuel rods 7 are held in predetermined positions relative one another with the help of a number of spacer grids, not shown. The nominal gap between adjacent fuel assemblies 3 in the core is 12 to 20 mm.

The reactor 1 further comprises a plurality of control rods 4 schematically indicated in FIG. 1. Each control rod 4 has a longitudinal centre axis z, see FIG. 3. The control rods 4 are located between the fuel assemblies 3 and are connected to drive members 5.

Figure 2:
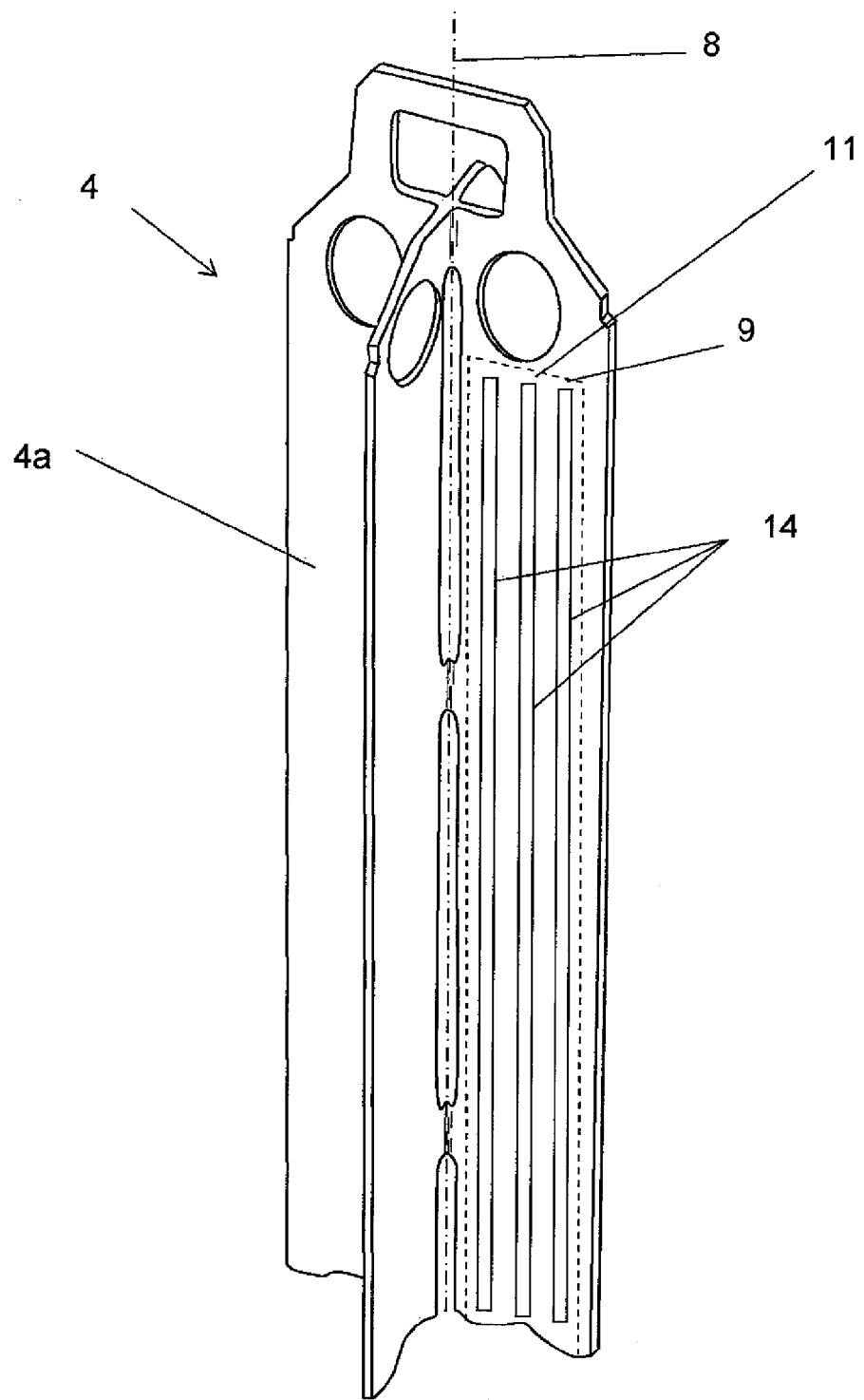
FIG. 2 schematically shows a part of a control rod according to an embodiment of the invention.
Figure 3:
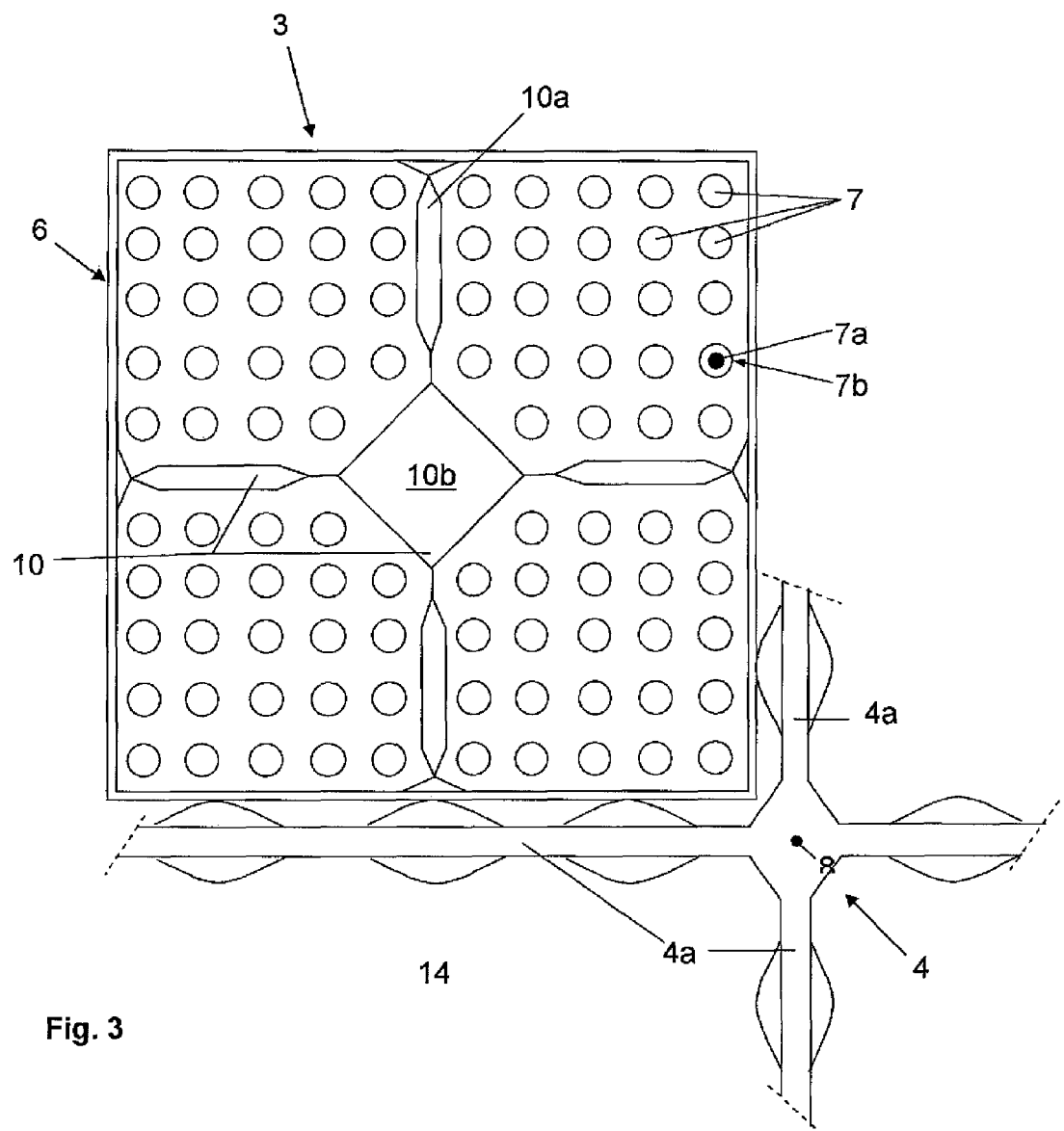
FIG. 3 schematically shows a part of a control rod and a fuel assembly in a view along the longitudinal centre axis of the control rod.

Each control rod 4 has four control rod blades 4a, see FIGS. 2 and 3, disposed in a cruciform arrangement. The drive members 5 are able to move the control rods 4 up and down in a vertical direction x into and out from a respective position between the fuel assemblies 3. The nominal thickness of the control rod blade 4a is 7-8 mm.

An absorber material 9 is arranged in each one of the control rod blades 4a. The absorber material 9 extends from a first absorber end 11 to a second absorber end 12, wherein the first absorber end 11 is closest to the top end of the control rod 4 and the first absorber end is thus inserted first into the control rod positions between the fuel assemblies 3. The distance between the first absorber end 11 and the second absorber end 12 defines an active length L of the control rod blade. Preferably, the extension of the absorber material in the different control rod blades 4a correspond to each other so that the first absorber end 11 and the second absorber end 12 are common to all control rod blades 4a on a control rod 4. The absorber material may be chosen from the group comprising boron carbide and alloys with hafnium as a main alloying material. These materials all have favourable neutron absorbing properties. It is to be noted that the invention is applicable also to so called grey control rods, i.e. control rods without or with a reduced amount of absorber material.

The control rod blades 4a are provided with distance means 13 which in the shown embodiment has the form of protrusions. The protrusions protrude 0.5-2 mm, preferably 0.5-1.5 mm or more preferably 0.8-1.2 mm from the sides of each control rod blade 4a.

In the embodiment shown in FIGS. 2 and 3, the protrusions are formed as ridges 14 that are evenly distributed radially. All ridges 14 extend essentially parallel to the longitudinal centre axis from the first absorber end 11 along half the active length of the control rod blades 4a. Only the upper half of the control rod is shown in FIG. 2. It is of course possible to let the ridges 14 extend along the entire active length of the control rod blades 4a. The ridges 14 have a smooth shape to facilitate the sliding of the control rod along the box. There might be protrusions on the channel box on which the ridges 14 on the control rods may get stuck in case they are not smoothly shaped.

The ridges 14 may be an integral part of the control rods 4, in which case they may be press formed into the control rods 4.

Figure 4:
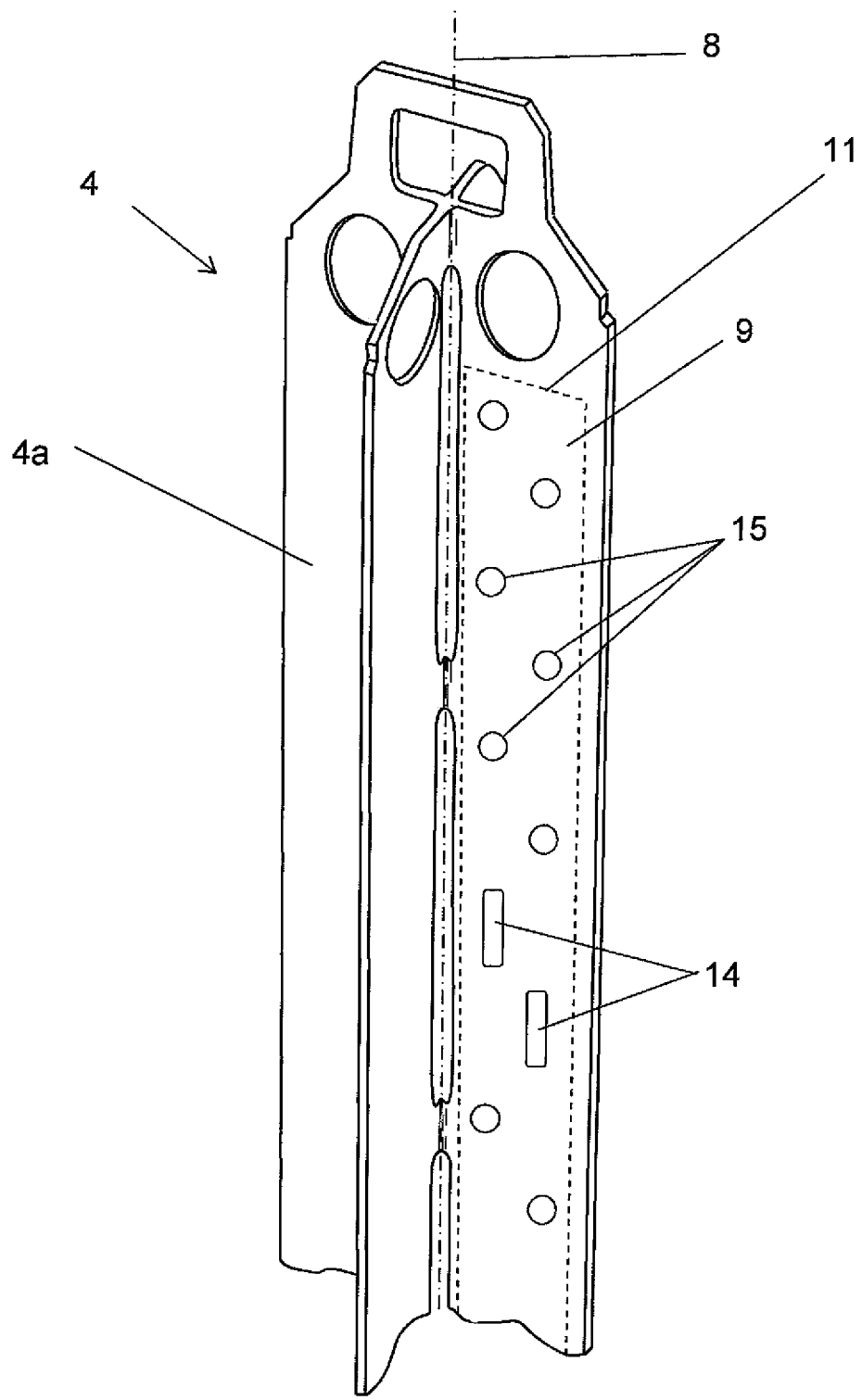
FIG. 4 shows schematically a part of a control rod according to a second embodiment of the invention.

FIG. 4 shows a part of a control rod 4 according to an alternative embodiment of the present invention. In the embodiment shown in FIG. 4 the protrusions are in the form of spot-like protrusions 15, and ridges 14 with a relatively short longitudinal extension. The spot-like protrusions 15 may for instance have the form of smooth cones. Also the spot-like protrusions 15 may be an integral part of the control rods 4, in which case they may be press formed into the control rods 4.

The present invention is not limited to the shown embodiments but can be varied and modified within the scope of the following claims.

The invention claimed is:

1. A control rod for a nuclear boiling water reactor, wherein the reactor comprises a plurality of fuel assemblies, elongated channel boxes forming outer casings of each fuel assembly and enclosing fuel rods, and a plurality of control rods which are configured to be insertable in respective control rod positions between the fuel assemblies, wherein the control rod has a longitudinal center axis and control rod blades, each control rod blade having a first and a second side and being substantially parallel to the longitudinal center axis, and wherein each control rod blade comprises an absorber material which extends along the longitudinal centre axis from a first absorber end to a second absorber end, a distance between the first absorber end and the second absorber end defining an active length of the control rod blade, wherein the control rod blades are provided with distance means on the first and second sides of the control rod blades, the distance means extending a distance of at least a third of the active length of the control rod blade, the distance means being configured to ensure a minimum distance between the control rod blade and the channel box, and to enable the control rod to easily slide along the channel box, wherein the distance means have the form of protrusions, each of which protrudes 0.5-2 mm from the sides of the control rod blades, wherein the distance means are press formed in, or welded onto, the control rod blades and form a homogeneous part of the control rod blades, wherein each of the protrusions comprises an elongated ridge and the ridges are provided along lines extending in parallel to the longitudinal center axis and distributed along a width of the first and second sides, radially out from the longitudinal center axis.

2. The control rod according to claim 1, wherein the distance means is distributed on the sides of the control rod blades.

3. The control rod according to claim 1, wherein the protrusions have a curved shape, the curved shape facilitating the sliding of the control rod along the channel box.

4. The control rod according to claim 3, wherein at least one protrusion is provided on an upper portion of the control rod blade and at least one protrusion is provided on a lower portion of the control rod blade.

5. The control rod according to claim 1, wherein the control rod is arranged to be inserted in the control rod position with the first absorber end first and wherein the ridges extend from the first absorber end on the first and the second sides of the control rod blades.

6. The control rod according to claim 5, wherein the ridges extend along the full active length on the first and the second sides of the control rod blades.

7. The control rod according to claim 1, wherein each protrusion comprises a spot-like protrusion.

8. The control rod according to claim 1, wherein the control rod comprises four control rod blades, the control rod blades being arranged to form a control rod having a cruciform cross section.

9. The control rod according to claim 1, wherein the control rod is made mainly of a first material which is different from the absorber material.

* * * * *